(12) United States Patent
Kaku

(10) Patent No.: US 7,286,703 B2
(45) Date of Patent: Oct. 23, 2007

(54) IMAGE CORRECTION APPARATUS, METHOD AND PROGRAM

(75) Inventor: Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/228,224

(22) Filed: Sep. 19, 2005

(65) Prior Publication Data

US 2006/0078216 A1 Apr. 13, 2006

(30) Foreign Application Priority Data

Sep. 30, 2004 (JP) .............................. 2004-285683

(51) Int. Cl.
*G06K 9/00* (2006.01)
(52) U.S. Cl. ..................... 382/167; 382/162; 358/516; 358/518
(58) Field of Classification Search ................ 382/162, 382/167; 358/516, 518
See application file for complete search history.

(56) References Cited

U.S. PATENT DOCUMENTS

| | | | | |
|---|---|---|---|---|
| 5,099,313 A * | 3/1992 | Suemoto et al. | ......... | 348/226.1 |
| 5,169,347 A * | 12/1992 | Sang | ............ | 439/885 |
| 5,408,263 A * | 4/1995 | Kikuchi et al. | ............... | 348/68 |
| 5,621,494 A * | 4/1997 | Kazumi et al. | ............. | 396/546 |
| 5,659,357 A * | 8/1997 | Miyano | .................... | 348/223.1 |
| 6,075,563 A * | 6/2000 | Hung | ..................... | 348/223.1 |
| 6,727,942 B1 * | 4/2004 | Miyano | .................... | 348/223.1 |
| 6,739,767 B2 * | 5/2004 | Ikeda et al. | ................ | 396/567 |
| 6,788,812 B1 * | 9/2004 | Wilkins | ....................... | 382/167 |
| 6,791,606 B1 * | 9/2004 | Miyano | .................... | 348/223.1 |
| 6,947,079 B2 * | 9/2005 | Parulski et al. | ........... | 348/223.1 |
| 6,995,791 B2 * | 2/2006 | Skow | ....................... | 348/223.1 |
| 7,006,135 B2 * | 2/2006 | Ishimaru et al. | .......... | 348/223.1 |
| 2002/0106206 A1 * | 8/2002 | Takeshita | ..................... | 396/429 |
| 2003/0090750 A1 * | 5/2003 | Takahashi | ..................... | 358/516 |
| 2003/0098916 A1 * | 5/2003 | Noguchi | ....................... | 348/272 |
| 2003/0164828 A1 * | 9/2003 | Hung | ........................... | 345/426 |
| 2004/0057615 A1 * | 3/2004 | Johannesson et al. | ........ | 382/167 |
| 2004/0120575 A1 * | 6/2004 | Cheng | .......................... | 382/167 |
| 2004/0190770 A1 * | 9/2004 | Spaulding et al. | ........... | 382/167 |

FOREIGN PATENT DOCUMENTS

JP 2002-152772 A 5/2002

* cited by examiner

*Primary Examiner*—Matthew C. Bella
*Assistant Examiner*—Tom Y Lu
(74) *Attorney, Agent, or Firm*—Sughrue Mion, PLLC

(57) ABSTRACT

An identification-data memory is connected to a light-source identifying circuit. Data representing a type of characteristic quantity to be used in making an identification and identification points are stored in the identification-data memory with regard to each type of a plurality of light sources. Based upon input image data, a characteristic quantity is read out and identification points decided in accordance with the identification-data memory. The type of light source that was used to acquire an image represented by image data to be processed is discriminated in accordance with the identification points that have been decided. A color temperature that corresponds to the light-source type discriminated is set in a color-temperature setting circuit, and gray pixels having the set color temperature are extracted from the input image. White-balance correction coefficients are decided based upon the gray pixels extracted.

3 Claims, 9 Drawing Sheets

Fig. 3

| LIGHT-SOURCE TYPE | TYPE OF CHARACTERISTIC QUANTITY USED IN MAKING IDENTIFICATION | IDENTIFICATION POINTS |
|---|---|---|
| TUNGSTEN LAMP | R-VALUE AVERAGE | -2.1, -1.1, 1.5, ... 2.0, 2.2 |
| FLUORESCENT LAMP | B-VALUE AVERAGE | -6.2, -6.1, -5.6, ... -3.6, 3.9 |
|  | G-VALUE AVERAGE | 2.5, 2.2, 1.6, ... 2.1, 2.2 |
| DAYLIGHT | R-VALUE AVERAGE | -3.2, -3.0, -2.7, ... -4.1, 4.3 |
|  | G-VALUE AVERAGE | -4.3, -3.6, -3.1, ... -4.6, 5.1 |

~21

IMAGE CORRECTION APPARATUS, METHOD AND PROGRAM

BACKGROUND OF THE INVENTION

1. Field of the Invention

This invention relates to an image correction apparatus, method and program. More particularly, the invention relates to an apparatus, method and program for performing a white-balance correction.

2. Description of the Related Art

According to the specification of Japanese Patent Application Laid-Open No. 2002-152772, gray or skin-color pixels contained in an input image are detected and the color temperature of the light source used in photography is estimated using color information obtained from the gray or skin-color pixels detected.

According to the method of the above-mentioned specification, a gray pixel or skin-color pixel is detected using only the color information of this pixel. There is a possibility, therefore, that a pixel corresponding to a color temperature that differs from that of the light source at the time of photography will be extracted erroneously as a gray pixel or skin-color pixel. Further, since the correction of white balance is premised on detection of gray or skin-color pixels, it is impossible to perform the white-balance correction if the image does not contain gray or skin-color pixels.

SUMMARY OF THE INVENTION

Accordingly, an object of the present invention is to perform a white-balance correction in a highly precise manner.

Another object of the present invention is to specify with comparatively good precision the type of a light source, which is used when a picture is taken and for which image data has been obtained, based upon this image data.

According to the present invention, the foregoing object is attained by providing an image correction apparatus comprising: an identification data memory storing, with regard to one or each of a plurality of light-source types, data representing a type of characteristic quantity that takes on values in which values obtained based upon an image that has been acquired by taking a picture under a light source of one light-source type and values obtained based upon an image that has been acquired by taking a picture under a light source of another light-source type are distinguished from each other; a photographic light-source discriminating device (photographic light-source discriminating means) for discriminating, based upon a characteristic quantity that is calculated based upon the data representing the type of characteristic quantity regarding one or each of the plurality of light-source types stored in the identification data memory, under which light source among a predetermined one or plurality of light-source types an image represented by applied image data has been captured; and an image correcting device (image correcting means) for subjecting the image data to white-balance adjustment processing that corresponds to the photographic light-source type discriminated by the photographic light-source discriminating device.

An image correction method according to the present invention comprises the steps of: discriminating under which light source among a predetermined one or plurality of light-source types an image represented by applied image data has been captured, using an identification data memory storing, with regard to one or each of a plurality of light-source types, data representing a type of characteristic quantity that takes on values in which values obtained based upon an image that has been obtained by taking a picture under a light source of one light-source type and values obtained based upon an image that has been acquired by taking a picture under a light source of another light-source type are distinguished from each other, wherein the discrimination is made based upon a characteristic quantity that is calculated based upon the data representing the type of characteristic quantity regarding one or each of the plurality of light-source types stored in the identification data memory; and subjecting the image data to white-balance adjustment processing that corresponds to the photographic light-source type discriminated.

An image correction program according to the present invention is a program for controlling a computer having an identification data memory storing, with regard to one or each of a plurality of light-source types, data representing a type of characteristic quantity that takes on values in which values obtained based upon an image that has been acquired by taking a picture under a light source of one light-source type and values obtained based upon an image that has been acquired by taking a picture under a light source of another light-source type are distinguished from each other, wherein the program causes the computer to execute the following processing: photographic light-source discriminating processing for discriminating, based upon a characteristic quantity that is calculated based upon the data representing the type of characteristic quantity regarding one or each of the plurality of light-source types stored in the identification data memory, under which light source among a predetermined one or plurality of light-source types an image represented by applied image data has been captured; and image correcting processing for subjecting the image data to white-balance adjustment processing that corresponds to the photographic light-source type discriminated.

Types of characteristic quantities used in discriminating (identifying, deciding, estimating or determining) photographic light sources and stored in the identification data memory can be obtained by learning processing executed in advance. In learning processing, a plurality of images obtained by taking pictures under one light-source type to be discriminated and a plurality of images obtained by taking pictures under light sources other than this light source are prepared with regard to each light-source type to be discriminated, a prescribed characteristic quantity is calculated with regard to each of these light sources, and histograms are created. If the values of the prescribed characteristic quantities differ in the plurality of images obtained by taking pictures under one light-source type to be discriminated and the plurality of images obtained by taking pictures under a light source other than this light source (i.e., if peaks of the histograms take on values spaced apart from each other), then, by acquiring such a characteristic quantity (type of characteristic quantity) from the applied image data, whether the image is one that was captured under a photographic light source of one type or under the photographic light source of another type can be discriminated.

In accordance with the present invention, first it is discriminated under which light source among a predetermined one or plurality of light-source types an image represented by applied image data has been captured. The color temperature that corresponds to the photographic light source determined can be ascertained based upon the discrimination of the photographic light source. As a result, a white-balance correction can be performed more accurately based upon this color temperature.

In one embodiment, the apparatus further comprises: a pixel extracting device (pixel extracting means) for extracting pixels of a prescribed color (e.g., either a gray pixel or a skin-color pixel), which has a color temperature in a color-temperature range corresponding to the photographic light-source type that has been discriminated by the photographic light-source discriminating device, from pixels constituting the image represented by the image data; and an average color-difference calculating device (average color-difference calculating means) for calculating an average color difference of the pixels of the prescribed color extracted by the pixel extracting device. Correction coefficients for which the average color difference calculated by the average color-difference calculating device becomes a prescribed value are found and the image data is subjected to a white-balance correction based upon these correction coefficients.

By way of example, since an ideal gray pixel is intrinsically a pixel whose color difference is "0", the white balance (color balance) of applied image data can be corrected with excellent precision based upon a correction coefficient that furnishes "0" for the average color difference of gray pixels that have been extracted based upon the color-temperature range that corresponds to the photographic light-source type discriminated (namely gray pixels that have appeared in the image upon undergoing a change of color owing to a color ascribable to the photographic light source). With regard to skin-color pixels, correction coefficients are calculated such that the average color difference will become a prescribed value that has been set in advance.

In another embodiment, the apparatus further comprises: a pixel extracting device (pixel extracting means) for extracting a pixel of a prescribed color, which has a color temperature in a color-temperature range corresponding to the photographic light-source type that has been discriminated by the photographic light-source discriminating device, from pixels constituting the image represented by the image data; and an average color-difference calculating device (average color-difference calculating means) for calculating an average color difference of the pixel of the prescribed color extracted by the pixel extracting device; wherein the image correcting device obtains a correction direction in a color-difference space in which the average color difference that has been calculated by the average color-difference calculating means becomes a prescribed value, obtains a color-difference histogram in which the color difference of each extracted pixel of the prescribed color is projected upon a straight line defined in color-difference space by the correction direction, obtains correction coefficients in which an n %-range point that is nearer to the origin of the color-difference space in the color-difference histogram is adopted as the prescribed value, and subjects the image data to a white-balance correction based upon these correction coefficients.

Since the correction direction in color space (color-difference space) is a correction direction in which the average color difference calculated by the average color-difference calculating device becomes the prescribed value, a white-balance correction in which gray pixels, for example, approach the intrinsic gray color is implemented. The white-balance adjustment is performed based upon the correction coefficient in which an n %-range point that is nearer to the origin of the color space in the color-difference histogram is adopted as the prescribed value. As a result, by suitably setting the n %-range point, the amount of correction along the correction direction (the magnitude of application of white-balance adjustment and the extent of application) can be made to conform to user (operator) preference. For example, if the point in the n %-range point is set to a point in the 1% range to the 10% range (n=1 to 10), in general the effect of the correction is weakened in comparison with a white-balance correction that is based upon a correction coefficient in which the average color difference is adopted as the prescribed value. As a result, an image represented by image data that has undergone a white-balance correction is prevented from giving the impression of an over-correction.

It may be so arranged that a white-balance adjustment is performed adopting as an object of processing only pixels of a prescribed color extracted by the pixel extracting device using the correction coefficients that have been calculated, it is determined whether the pixels of the prescribed color after the correction have been corrected to a suitable color, and the degree of application (extent of application) of the white-balance adjustment to all image data based upon the calculated correction coefficients is adjusted in accordance with the result of the determination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates the content of an identification data memory;

DESCRIPTION OF THE PREFERRED EMBODIMENTS

A preferred embodiment of the present invention will now be described in detail with reference to the drawings.

Figure 1:
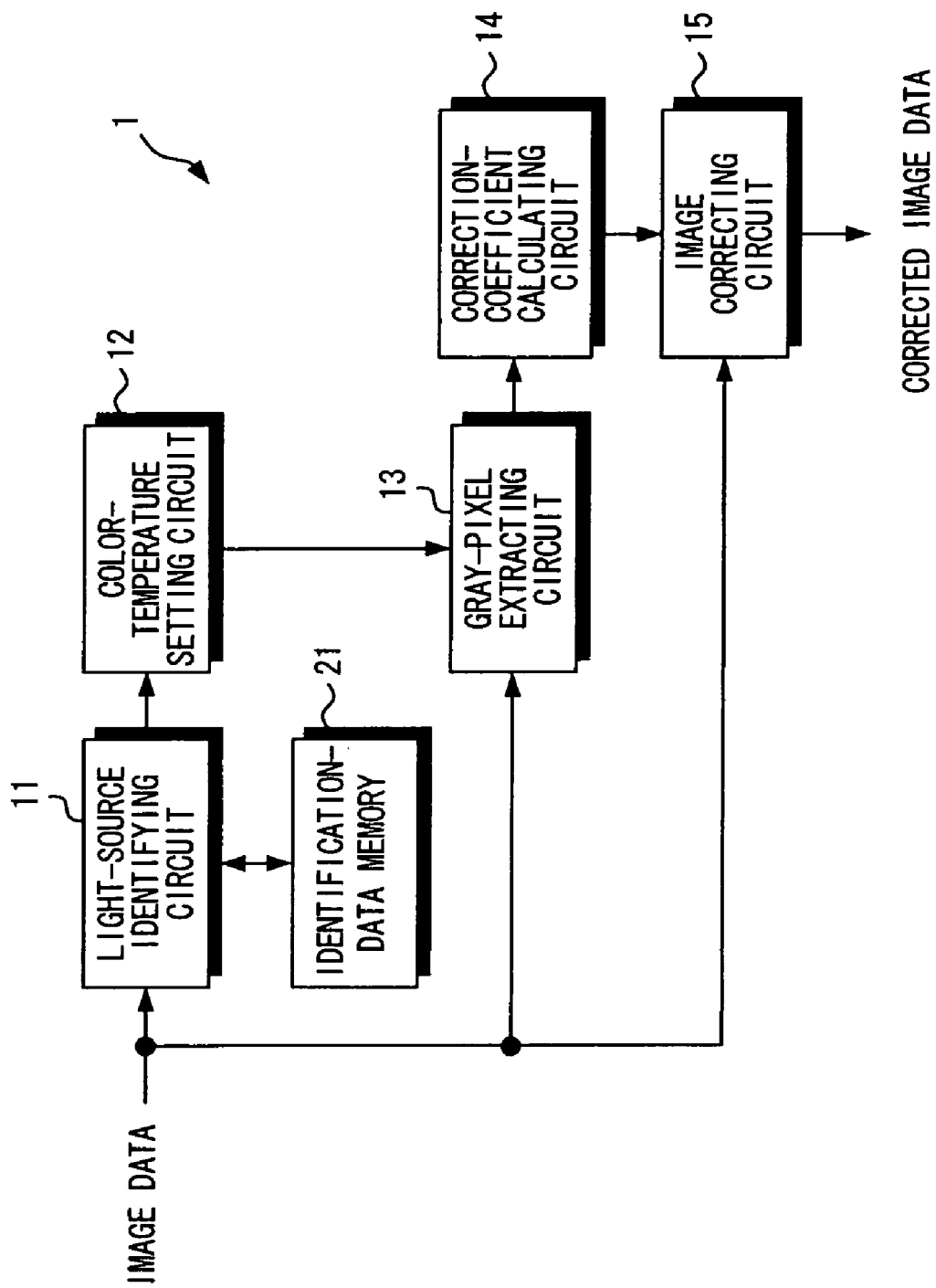
FIG. 1 is a block diagram illustrating the electrical structure of an image correction apparatus according to the present invention.
Figure 2:
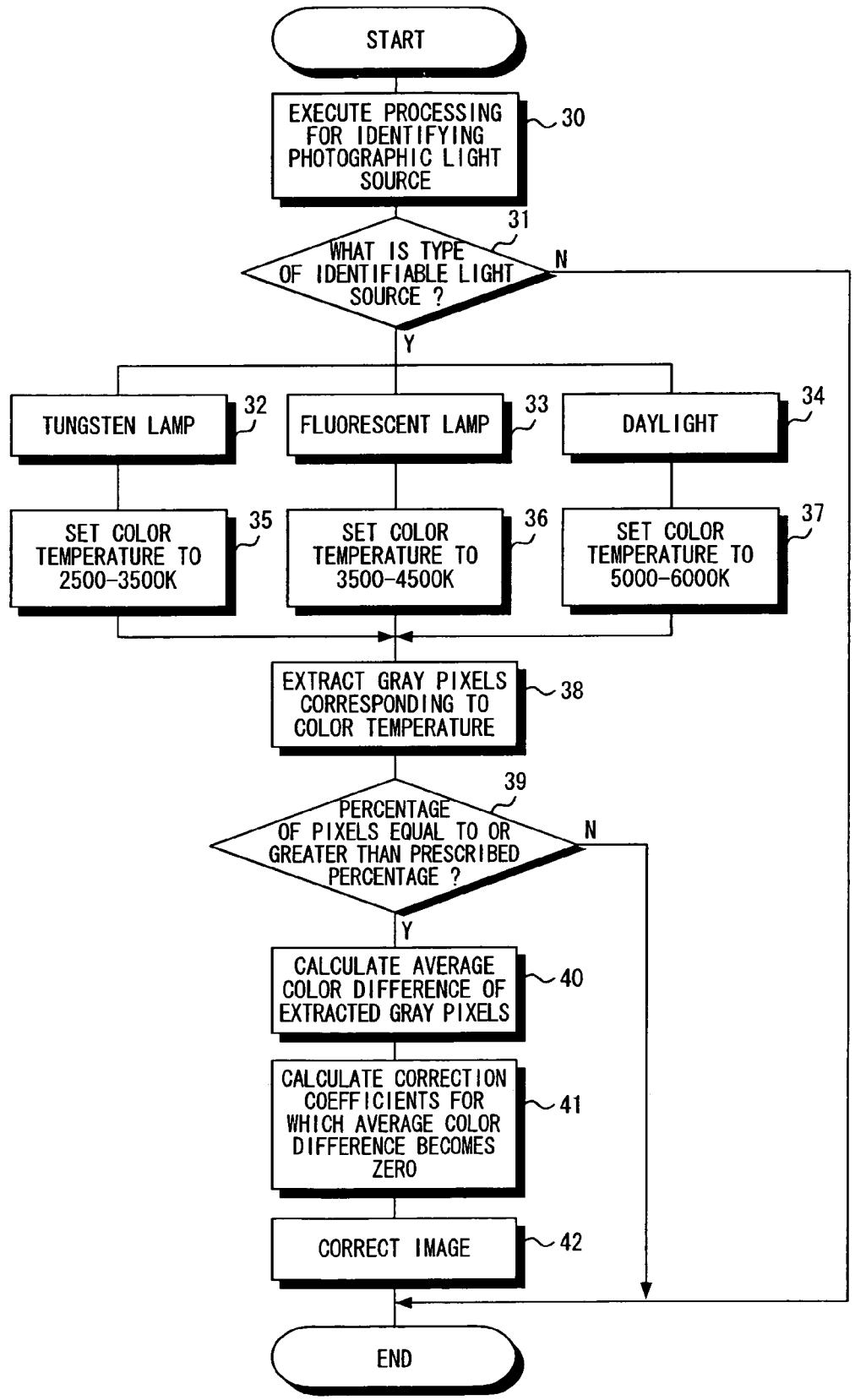
FIG. 2 is a flowchart illustrating processing executed by the image correction apparatus.

FIG. 1 is a block diagram illustrating the electrical structure of an image correction apparatus 1 according to the present invention, and FIG. 2 is a flowchart illustrating the flow of processing executed by the image correction apparatus.

The image correction apparatus 1 includes a light-source identifying circuit 11, a color-temperature setting circuit 12, a gray-pixel extracting circuit 13, a correction-coefficient calculating circuit 14 and an image correcting circuit 15.

Image data (an image file) that has been read from a storage device (not shown) or transmitted over a network is applied to the image correction apparatus 1. The image data (image file) is applied to the light-source identifying circuit 11, gray-pixel extracting circuit 13 and image correcting circuit 15.

The light-source identifying circuit 11 analyzes the image represented by the applied image data and identifies under what light source the image data was captured by photography, i.e., identifies the type of light source used when the image data was recorded (namely when the image was captured by taking a picture). An identification-data memory 21 is connected to the light-source identifying circuit 11. The light-source identifying circuit 11 identifies (discriminates) the type of light source based upon identification data that has been stored in the identification-data memory 21.

FIG. 3 illustrates the content of the identification-data memory 21. Identification data (data representing the type of characteristic quantity used in identification and a group of identification points) has been stored for every type of light source to be identified. According to this embodiment, identification data (data representing the type of characteristic quantity used in identification and a group of identification points) has been stored with regard to three types of light sources, namely "Tungsten Lamp", "Fluorescent Lamp" and "Daylight".

Figure 4:
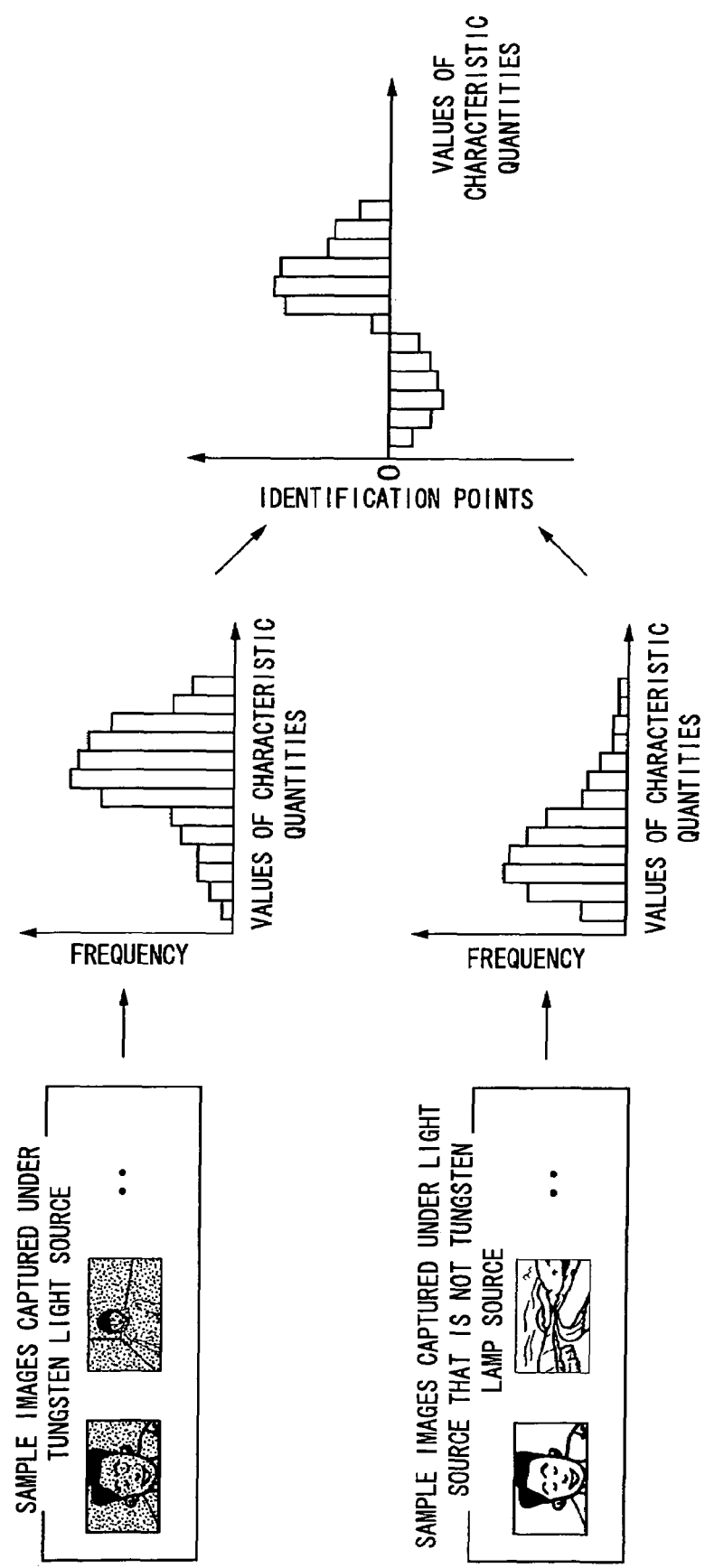
FIG. 4 illustrates the flow of a process (learning processing) for calculating identification points stored in the identification data memory.

Identification data stored in the identification-data memory 21 is obtained by learning processing, one example of which is illustrated in FIG. 4.

Learning processing regarding the light-source type "Tungsten Lamp" will be described. The first step is to prepare a plurality of items of image data (referred to as "tungsten light-source sample images" below) obtained by taking pictures under a tungsten light source, and a plurality of items of image data (referred to as "non-tungsten light-source sample images" below) obtained by taking pictures under a light source (e.g., a fluorescent light source or daylight light source) other than a tungsten light source (see the left side of FIG. 4).

One type of characteristic quantity, e.g., the average of the R values, is selected. The value of the selected type of characteristic quantity (the R-value average) is calculated using a plurality of tungsten light-source sample images, and a frequency histogram thereof is created. Similarly, the value of the selected type of characteristic quantity (the R-value average) is calculated using a plurality of non-tungsten light-source sample images, and a frequency histogram thereof is created (see the central portion of FIG. 4).

If there is a frequency-histogram bias conforming to values of the characteristic quantities in the frequency histogram (top center in FIG. 4) created using the tungsten light-source sample images and in the frequency histogram (bottom center in FIG. 4) created using the non-tungsten light-source sample images, then it can be said that the selected type of characteristic quantity is one that is suited to making the identification between an image obtained by photography under a tungsten light source and an image obtained by photography under a non-tungsten light source. The type of characteristic quantity used in creating a frequency histogram is selected from this standpoint.

Logarithmic values, which are the ratios of the frequency values for all values of the corresponding characteristic quantities of the two created frequency histograms, are calculated. The term "identifying device" (the right side of FIG. 4) shall be used to refer to means for representing the calculated logarithmic values in the form of a histogram.

The values (the above-mentioned logarithmic values) along the vertical axis in the identifying device shown on the right side of FIG. 4 are the "identification points" (see FIG. 3).

With regard to the applied image data, the light-source identifying circuit 11 calculates the characteristic quantities regarding the types of characteristic quantities that have been stored in the identification-data memory 21 and acquires the identification points corresponding to the calculated characteristic quantities. For example, in the determination as to whether a captured image is one that was shot under a tungsten light source, the light-source identifying circuit 11 calculates the characteristic-quantity type "R-value average" based upon the image data and decides the identification points that correspond to the R-value average calculated. If the identification points decided are positive identification points, there is high likelihood that the input image was captured under a tungsten light source and it can be construed that the higher the logarithmic value, the greater this likelihood becomes. Conversely, if the identification points decided are negative identification points, there is high likelihood that the input image was not captured under a tungsten light source and it can be construed that the higher the logarithmic value, the greater this likelihood becomes.

Similarly, with regard to the characteristic-quantity types "Tungsten Lamp" and "Daylight", identification points are calculated by referring to the identification-data memory 21. In general, the image of a subject is not sensed under light sources that are a mixture of all or any two of the three types "Tungsten Lamp", "Fluorescent Lamp" and "Daylight". If identification points regarding one type of light source take on positive values, therefore, the identification points of the other two types of light sources will take on negative values. In a case where the identification points of any two or of all light-source types take on positive values, the light-source type having the largest absolute value is decided upon as the photographic light-source type (step 30).

If the identification points regarding all light-source types take on negative values, then correction processing is exited by reason of the fact that the photographic light-source type is unknown ("NO" at step 31).

The types of characteristic quantities used in identifying the type of light source may be plural in number with regard to each of the light-source types. In such case the average values of the identification points obtained from respective ones of the plurality of types of characteristic quantities are adopted at the identification points regarding the light-source types.

It should be noted that although the types of light sources discriminated are the three types "Tungsten Lamp", "Fluorescent Lamp" and "Daylight", it may be so arranged that identification is also performed with regard to light-source types other than the three mentioned above. In such case the identification data regarding this light-source type is stored in the identification-data memory 21 in advance.

If the light-source type is discriminated as being any one of "Tungsten Lamp", "Fluorescent Lamp" and "Daylight" ("YES" at step 31), then a color-temperature range conforming to this light-source type is set in the color-temperature setting circuit 12. Color-temperature ranges that have been set in advance are used as the color-temperature ranges corresponding to the light-source types.

By way of example, if it has been discriminated that the type of light source is the tungsten light source, the color-temperature range is set to 2,500 to 3,500 K (steps 32, 35). If it has been discriminated that the type of light source is the fluorescent light source, the color-temperature range is set to 3,500 to 4,500 K (steps 33, 36). If it has been discriminated that the type of light source is the daylight light source, the color-temperature range is set to 5,000 to 6,000 K (steps 34, 37).

Since the type of light source (color-temperature range) is decided, it is possible to also subject the entire image to be processed to a white-balance adjustment that conforms to the light-source type that has been decided. In order to further raise the precision of the white-balance adjustment, the processing set forth below is executed in the image correction apparatus 1.

The color-temperature range corresponding to the type of light source identified is applied to the gray-pixel extracting circuit 13. The latter extracts gray pixels, which have a color temperature in the color-temperature range provided by the color-temperature setting circuit 12, from the pixels constituting the image represented by the image data (step 38). For example, the gray-pixel extracting circuit 13 extracts pixels having color values (r,b) in a range in the neighborhood of a blackbody locus (see the specification of Japanese Patent Application Laid-Open No. 2002-152772 with regard to a gray—blackbody locus) with regard to gray in the color-temperature range provided by the color-temperature setting circuit 12.

The gray-pixel extracting circuit 13 further determines whether the number of extracted gray pixels is equal to or greater than a prescribed percentage (e.g., whether a value that is the result of dividing the number of extracted gray pixels by the number of pixels of the input image is greater than a prescribed value) (step 39). The reason for this is to so arrange it that correction processing will not be executed in a case where there is the possibility that the type of light source that has been identified by the processing for identifying the photographic light source is inappropriate. If the number of extracted pixels is smaller than the prescribed percentage, then it is construed that the light-source type that has been identified by the processing for identifying the photographic light source is inappropriate, the image correction apparatus 1 does not execute image correction processing and processing is exited directly ("NO" at step 39). This makes it possible to prevent over-correction and erroneous correction of the image data.

If the extracted number of pixels is equal to or greater than the prescribed percentage ("YES" at step 39), then information concerning the extracted gray pixels (e.g., the RGB values) is applied to the correction-coefficient calculating circuit 14.

The correction-coefficient calculating circuit 14 calculates the average color difference of the extracted gray pixels (step 40). It should be noted that color differences (Cb, Cr) of every pixel for which the average is taken are calculated according to the following set of equations:

$$Cr = R - Y$$

$$Cb = B - Y \quad \text{Equation (1)}$$

where R represents the R component of the RGB values of each pixel, B the B component of the RGB values of each pixel, and Y the luminance value, which is calculated according to the following equation, by way of example:

$$Y = (19R + 38G + 7B)/64 \quad \text{Equation (2)}$$

If it is assumed that the gray pixels are the ideal gray color, then the color difference thereof will be "0" intrinsically. However, there are instances where a gray pixel that should rightfully exhibit a color difference of "0" takes on a color ascribable to the light source used when the picture was taken, in which case the color difference will not be "0". For example, if a picture is taken of an object that is gray in color under a tungsten light source, the gray-colored object will take on an orange color in the image. Accordingly, the correction-coefficient calculating circuit 14 calculates white-balance correction coefficients (white-balance correction coefficients with regard to respective ones of the RGB values) for which the calculated color differences (Cb, Cr) become "0" (step 41). That is, the ratio of R, G, B for which Cr=0, Cb=0 holds is R:G:B=1:1:1, as is obvious from Equations (1) and (2) cited above. The correction-coefficient calculating circuit 14 calculates correction coefficients for which the ratio of the average R, G, B values of the gray pixels in the input image becomes 1:1:1.

The correction coefficients that have been calculated are applied to the image correcting circuit 15. The latter multiplies each of the pixels of the input image by the correction coefficients to thereby generate corrected image data for which the average color difference of the gray pixels is zero, i.e., corrected image data that has been undergone the white-balance correction (step 42).

It may be so arranged that pixels having another color, e.g., skin-color pixels, are extracted instead of the gray pixels. In the processing for extracting skin-color pixels, pixels having chromaticity values (r, b) in a range in the neighborhood of a black-body locus are calculated with regard to the skin color. Further, correction coefficients for which the average color difference takes on a standard value regarding skin color are calculated instead of correction coefficients for which the average color difference is made zero.

The correction coefficients used in the white-balance correction may be calculated by a method other than a method that obtains them from the standpoint of making "0" the average color difference of the gray pixels. For example, the color temperature of each extracted gray pixel (or skin-color pixel) may be found and correction coefficients for which the average value of color temperature becomes a set standard color temperature may be found. It may be arranged to obtain correction coefficients for which the average RGB value of extracted gray pixels (or skin-color pixels) becomes a prescribed value [e.g., (RGB)=(178,178, 178) in case of gray pixels]. Correction coefficients that lower the saturation of the extracted gray pixels may be obtained.

In the above-described embodiment, white-balance correction coefficients for which the average color difference (Cb,Cr) becomes "0" (white-balance correction coefficients with regard to each of the R, G, B values) are calculated. However, if white-balance correction coefficients for which the average color difference (Cb,Cr) becomes "0" are used, then pixels having the average color difference (or a color difference close to the average color difference) will be represented by a color from which a color ascribable to the light source (e.g., the tungsten light source) has been removed (e.g., by taking a picture under a tungsten light source, a gray-color object represented by the color orange is corrected to an image represented by the gray color). However, there are instances where white-balance correction coefficients for which the average color difference becomes "0" give the impression of an over-correction (e.g., there are instances where an image having an orange color overall owing to the picture being taken under a tungsten light source is corrected to an image having a blue color overall).

Figure 5:
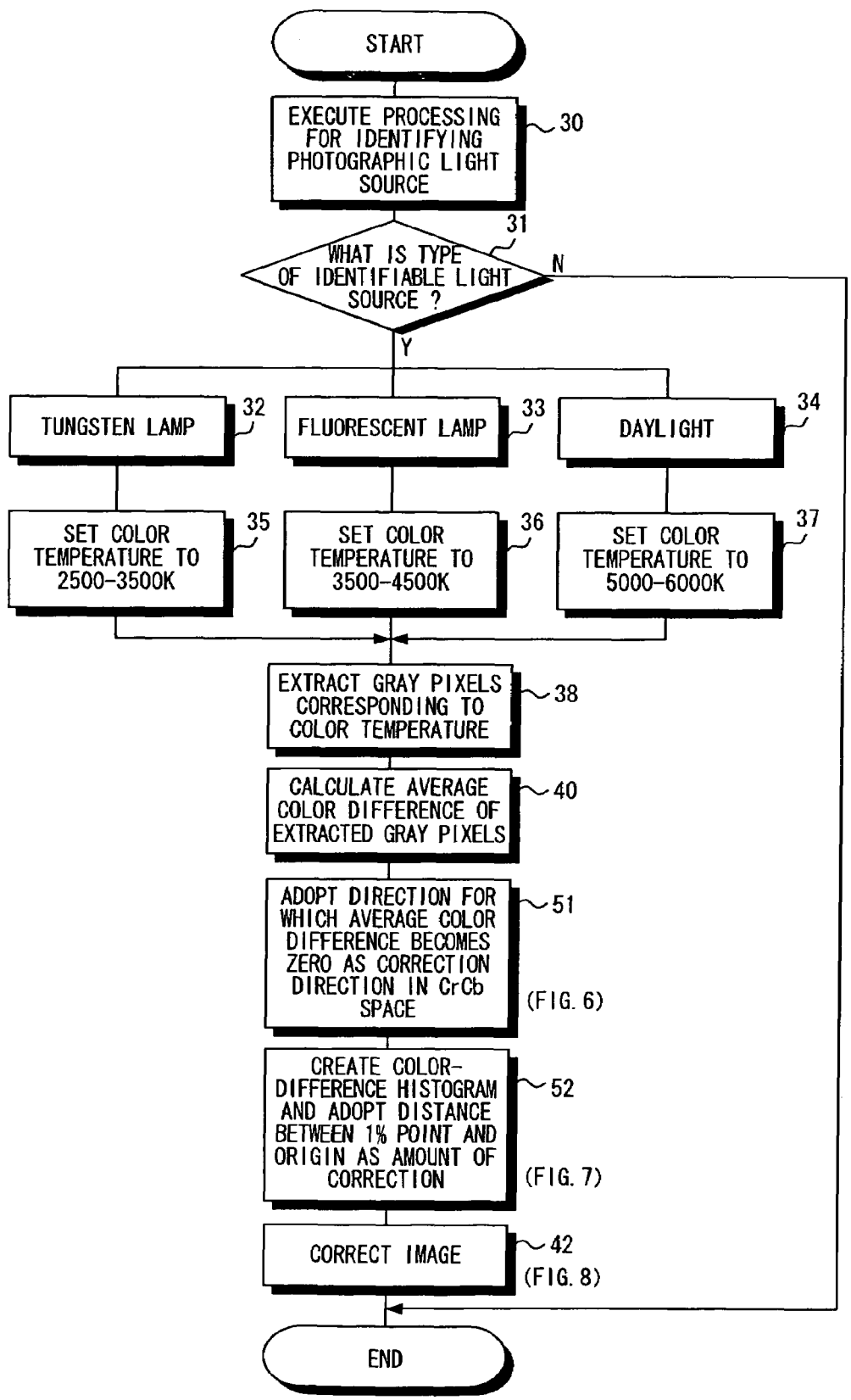
FIG. 5 is a flowchart illustrating processing executed by the image correction apparatus according to another embodiment of the invention.

FIG. 5 is a flowchart illustrating processing of another form executed by the image correction apparatus 1. Here the image correction apparatus 1 is caused to execute processing that makes it possible to calculate white-balance correction coefficients for which the above-described over-correction will not occur (that at least prevent the generation of a corrected image that gives the impression of an over-correction). The flowchart of FIG. 5 differs from that of FIG. 2 in the processing that follows the processing (step 38) for extracting gray pixels corresponding to color temperature. In the flowchart shown in FIG. 5, processing steps identical with those of the flowchart of FIG. 2 are designated by like step numbers and need not be described again. Further, reference will be had to the color-difference space shown in FIGS. 6 to 8 in the description of the flowchart shown in FIG. 5 below.

After the gray pixels having the color temperatures in the color-temperature range corresponding to the light-source type discriminated have been extracted (step 38), the average color difference of the extracted gray pixels is calculated (step 40).

Figure 6:
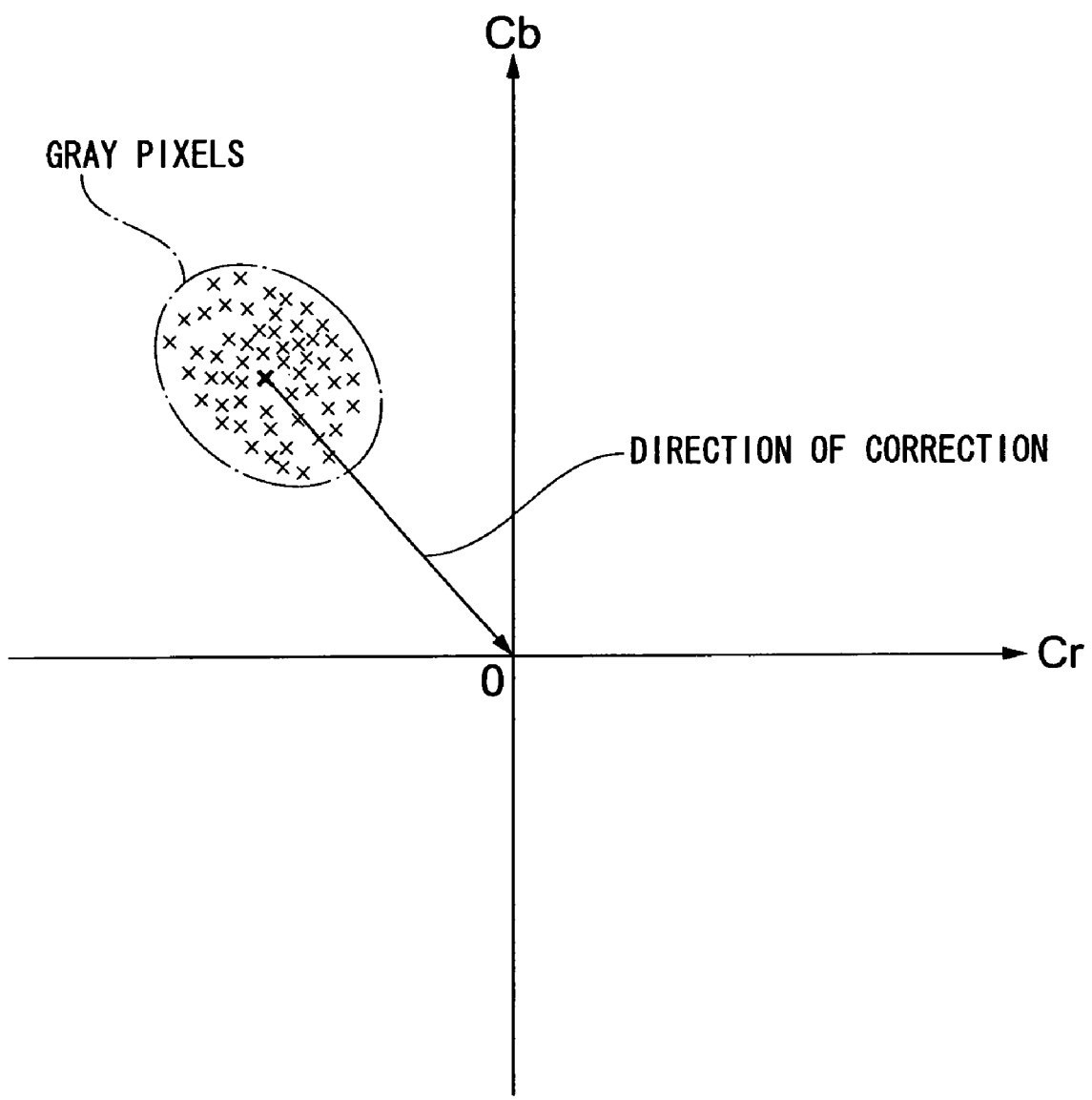
FIG. 6 illustrates a distribution of gray pixels in color-difference space and the manner in which a correction direction is decided.
Figure 7:
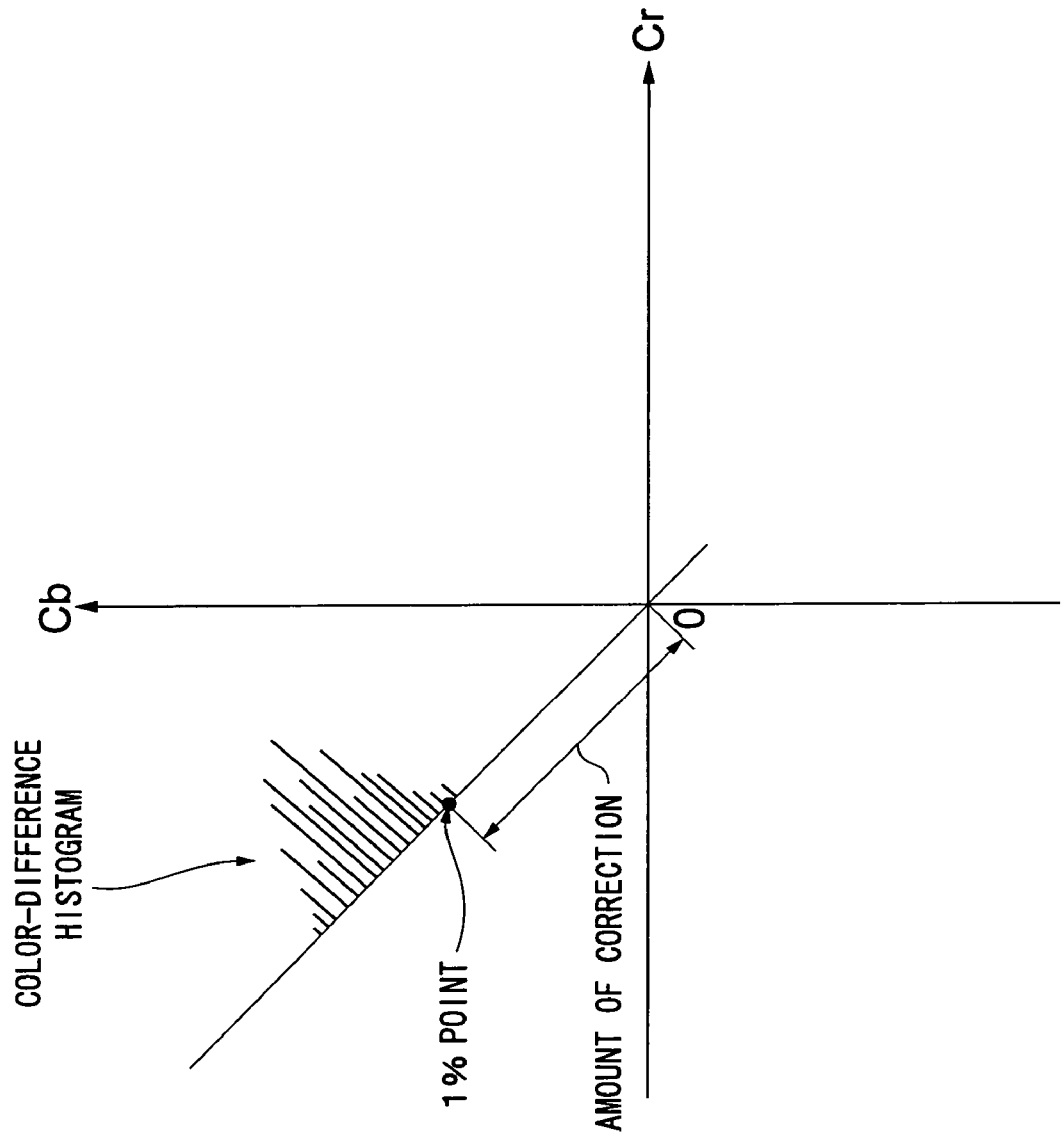
FIG. 7 illustrates the manner in which a color-difference histogram in color-difference space is created and the manner in which an amount of direction is decided.

The direction in which the calculated average color difference becomes "0" (Cr=0, Cb=0) is decided as the correction direction in color-difference space (CrCb space) (step 51; see FIG. 6). In FIG. 6, the small "x" symbols indicate each color difference (Cr, Cb) (a color-difference distribution of gray pixels before correction) of every pixel that has been extracted by processing for extracting the gray pixels. The large (bold) "x" symbol indicates the average color difference. That is, first processing for deciding the direction of correction is executed using the color-difference space.

After the direction of correction has been decided, processing for deciding the amount of correction [the size (extent) of the correction] is executed. In the processing for deciding the amount of correction, a histogram (referred to as a "color-difference histogram") is created by projecting the color difference of each gray pixel along the correction direction (on the straight line connecting the average color difference and the origin of the color-difference space) using the decided correction direction as a reference. In the color-difference histogram, the distance between the origin and the 1%-range point (1% point) (when the entire color-difference histogram is made 100%, a point that occupies a range of 1% of the histogram is adopted as the 1% point) that is near the origin of the color-difference space is decided upon as the amount of correction (step 52; see FIG. 7).

Figure 8:
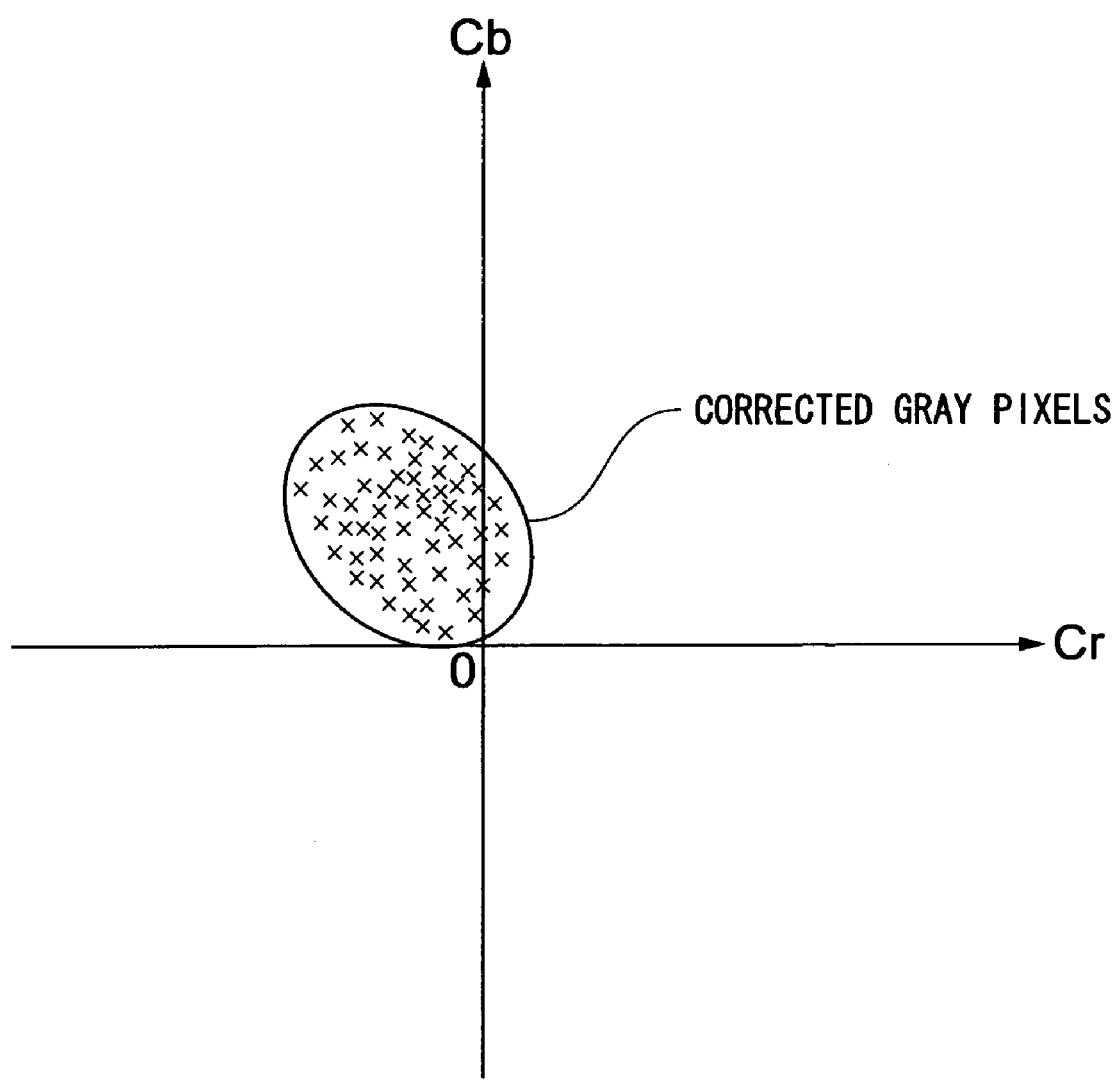
FIG. 8 illustrates a distribution of gray pixels after correction in color-difference space.

White-balance correction coefficients (white-balance correction coefficients with respect to each of the R, G, B values) are calculated in accordance with the correction direction and correction amount (i.e., a correction vector) decided in the manner described above. More specifically, correction coefficients for which the ratio of the R, G, B values obtained from the color difference of the 1% point will become 1:1:1 are calculated. The image data is corrected using the correction coefficients calculated (step 42; see FIG. 8). (FIG. 8 illustrates the corrected color-difference distribution only of gray pixels). Since the amount of correction is reduced in comparison with white-balance correction coefficients for which the average color difference becomes "0", over-correction of the image data can be prevented and the corrected image is prevented from giving an impression that is completely different from that of the image before the correction.

Figure 9:
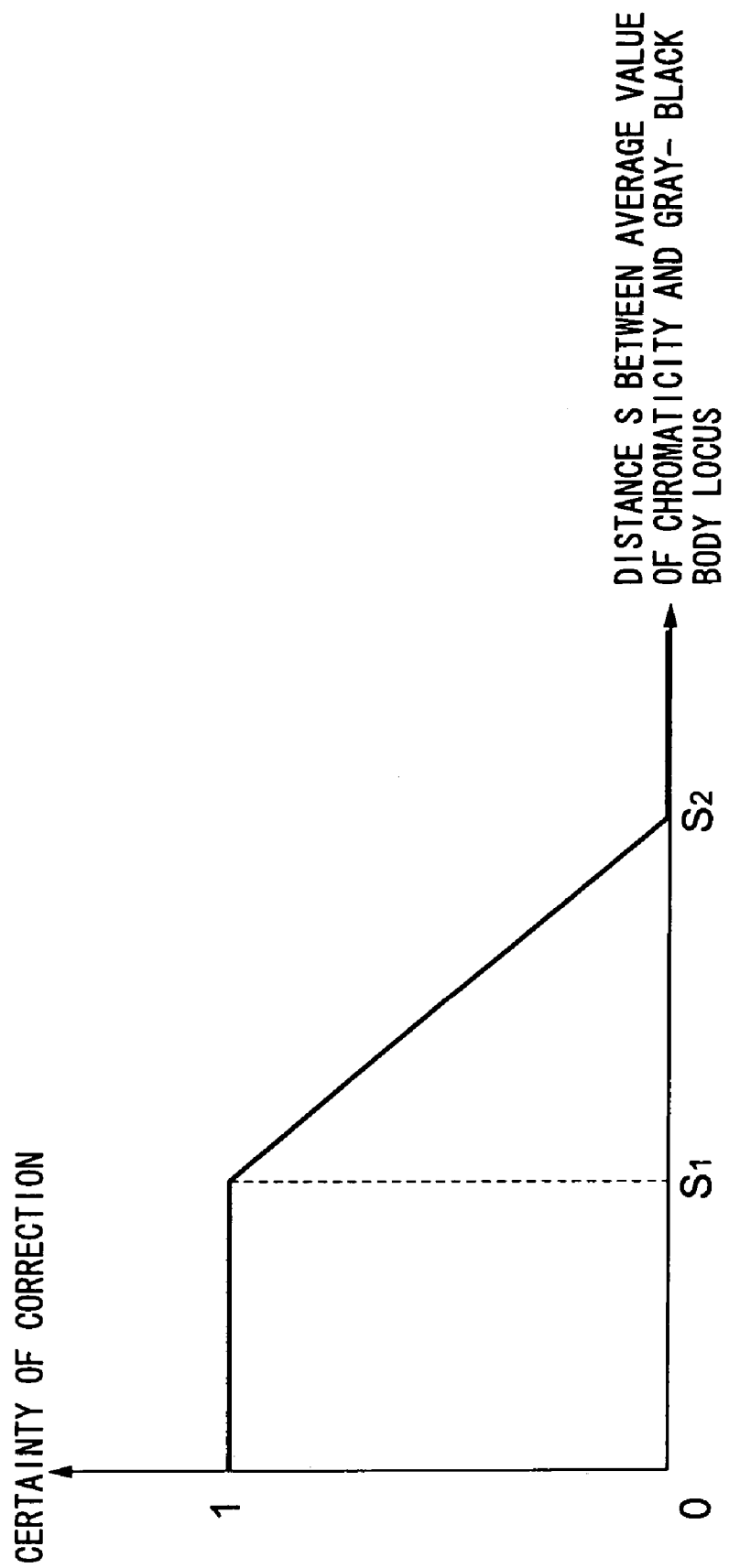
FIG. 9 is a graph illustrating the relationship between degree of certainty of a correction and the distance between an average value of chromaticity and a gray—blackbody locus.

It should be noted that a white-balance correction may be executed temporarily with regard to extracted gray pixels using the calculated white-balance correction coefficients, and it permissible to adjust the degree of application of correction processing that uses the calculated white-balance correction coefficients in accordance with the distance between the average value of chromaticity (r,b) of the corrected gray pixels and the gray-blackbody locus (the distance in color-difference space). For example, based upon the relationship between a distance S between the average value of chromaticity and the gray-blackbody locus and degree of certainty of correction shown in FIG. 9, if the distance S is less than a prescribed distance S1, i.e., in a case where gray pixels extracted based upon color temperature are corrected to pixels representing the original gray color (or near the gray color) by executing the white-balance correction using the calculated white-balance correction coefficients, the calculated white-balance correction coefficients are used as is (the degree of application is 100%). If the distance S is equal to or greater than a prescribed distance S2, i.e., in a case where gray pixels extracted based upon color temperature are not corrected to pixels representing the original gray color (or near the gray color) by executing the white-balance correction using the calculated white-balance correction coefficients, the white-balance correction is not executed (the degree of application is 0%). If the distance S is between the prescribed distances S1 and S2, then the larger the distance S, the smaller the degree of application of the white-balance correction. Even if the calculated white-balance correction coefficients are inappropriate, an adverse influence that appears in the corrected image as a result can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An image correction apparatus comprising:

an identification data memory storing, with regard to one or each of a plurality of light-source types, data representing a type of characteristic quantity that takes on values in which values obtained based upon an image that has been acquired by taking a picture under a light source of one light-source type and values obtained based upon an image that has been acquired by taking a picture under a light source of another light-source type are distinguished from each other;

a photographic light-source discriminating device for discriminating, based upon a characteristic quantity that is calculated based upon the data representing the type of characteristic quantity regarding one or each of the plurality of light-source types stored in said identification data memory, under which light source among a predetermined one or plurality of light-source types an image represented by applied image data has been captured;

a pixel extracting device for extracting pixels of a prescribed color, which has a color temperature in a color-temperature range corresponding to the photographic light-source type that has been discriminated by said photographic light-source discriminating device, from pixels constituting the image represented by the image data;

an image correcting device for subjecting the image data to white-balance adjustment processing that corresponds to the photographic light-source type discriminated by said photographic light-source discriminating device, using pixels of a prescribed color extracted by said pixel extracting device; and an average color-difference calculating device for calculating an average color difference of the pixels of the prescribed color extracted by the pixel extracting device;

wherein said image correcting device obtains a correction direction in a color-difference space in which the average color difference that has been calculated by said average color-difference calculating means becomes a prescribed value, obtains a color-difference histogram in which the color difference of each extracted pixel of the prescribed color is projected upon a straight defined in color-difference space by the correction direction, obtains correction coefficients in which an n% point that is nearer to the origin of the color-difference space in the color-difference histogram is adopted as the prescribed value, and subjects the image data to a white-balance correction based upon these correction coefficients.

2. An image correction method, comprising the steps of:

discriminating under which light source among a predetermined one or plurality of light-source types an image represented by applied image data has been captured, using an identification data memory storing, with regard to one or each of a plurality of light-source types, data representing a type of characteristic quantity that takes on values in which values obtained based upon an image that has been obtained by taking a picture under a light source of one light-source type and values obtained based upon an image that has been acquired by taking a picture under a light source of another light-source type are distinguished from each other, wherein the discrimination is made based upon a characteristic quantity that is calculated based upon the data representing the type of characteristic quantity regarding one or each of the plurality of light-source types stored in the identification data memory;

extracting pixels of a prescribed color, which has a color temperature in a color-temperature range corresponding to the discriminated photographic light-source type, from pixels constituting the image represented by the image data;

calculating an average color difference of the extracted pixels of the prescribed color;

obtaining a correction direction in a color-difference space in which the average color difference becomes a prescribed value;

obtaining a color-difference histogram in which the color difference of each extracted pixel of the prescribed color is projected upon a straight line defined in color-difference space by the correction direction;

obtaining correction coefficients in which an n% point that is nearer to the origin of the color-difference space in the color-difference histogram is adopted as the prescribed value; and subjecting the image data to a white-balance correction based upon these correction coefficients.

3. A computer-executable program embodied on a computer-readable medium, the program controlling a computer having an identification data memory storing, with regard to one or each of a plurality of light-source types, data representing a type of characteristic quantity that takes on values in which values obtained based upon an image that has been acquired by taking a picture under a light source of one light-source type and values obtained based upon an image that has been acquired by taking a picture under a light source of another light-source type are distinguished from each other, wherein the program causes the computer to execute the following processing:

photographic light-source discriminating processing for discriminating, based upon a characteristic quantity that is calculated based upon the data representing the type of characteristic quantity regarding one or each of the plurality of light-source types stored in the identification data memory, under which light source among a predetermined one or plurality of light-source types an image represented by applied image data has been captured;

pixel extracting processing for extracting pixels of a prescribed color, which has a color temperature in a color-temperature range corresponding to the discriminated photographic light-source type, from pixels constituting the image represented by the image data; and image correcting processing for subjecting the image data to white-balance adjustment processing that corresponds to the discriminated photographic light-source type, using the extracted pixels of a prescribed color; and an average color-difference calculating processing for calculating an average color difference of the pixels of the prescribed color extracted by the pixel extracting processing;

wherein said image correcting processing obtains a correction direction in a color-difference space in which the average color difference that has been calculated by said average color-difference calculating processing becomes a prescribed value, obtains a color-difference histogram in which the color difference of each extracted pixel of the prescribed color is projected upon a straight line defined in color-difference space by the correction direction, obtains correction coefficients in which an n% point that is nearer to the origin of the color-difference space in the color-difference histogram is adopted as the prescribed value, and subjects the image data to a white-balance correction based upon these correction coefficients.

* * * * *